June 15, 1926.
A. W. RICHTER
1,588,687
STEERING KNUCKLE BUSHING REMOVER
Filed June 16, 1924
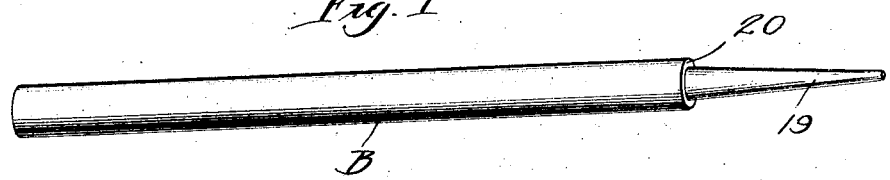
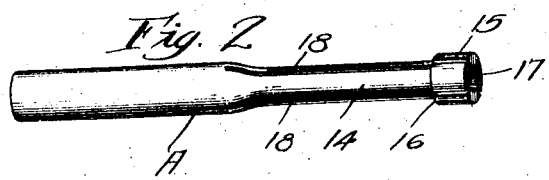
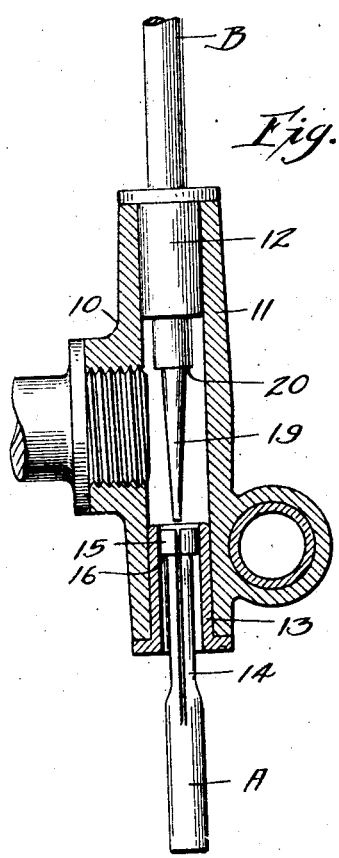
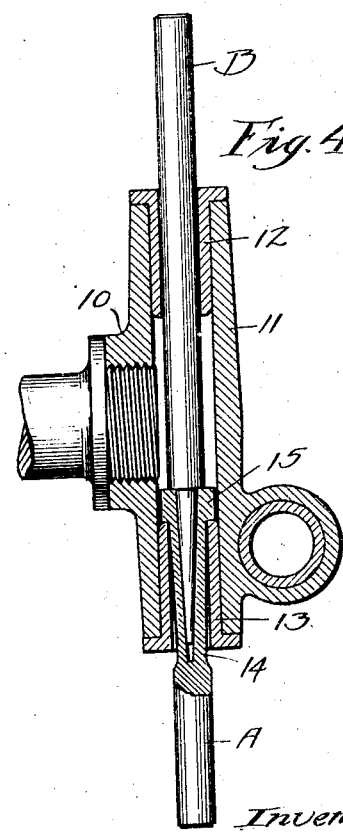
Inventor
Alfred W. Richter
By Bair & Truman

Patented June 15, 1926.

1,588,687

UNITED STATES PATENT OFFICE.

ALFRED W. RICHTER, OF ROCK VALLEY, IOWA.

STEERING-KNUCKLE-BUSHING REMOVER.

Application filed June 16, 1924. Serial No. 720,445.

My invention relates to means for removing the bushings from the steering knuckle of an automotive vehicle, and has for its object the providing of a pair of tools for this purpose, of simple, durable and inexpensive construction.

A further object is to provide means for removing the bushings, which is positive in action and by which the bushings may be removed in a minimum space of time.

A further object is to provide means for removing the bushings which will not injure the interior of the bearing shell or boxing.

A still further object is to provide means by which the bushings may be driven out by sharp blows, the means transmitting the force equally to the end of a bushing.

My invention is preferably embodied in a pair of tools, one of them having an expansible head insertable through one of the bushings and engageable with the inner end of the bushing when expanded, and the other having means for expanding the head and then engaging it for transmitting pressure thereto for forcing out the bushing.

With these and other objects in view, my invention consists in the construction, arrangement and combination of the various parts of my device, whereby the objects contemplated are attained as hereinafter more fully set forth, pointed out in my claims and illustrated in the accompanying drawings, in which:

Fig. 1 is a perspective view of the expanding tool.

Fig. 2 is a perspective view of the engaging tool.

Fig. 3 is a sectional view through a Ford steering knuckle, illustrating the manner of inserting the tools.

Fig. 4 is a similar view illustrating the engaging tool in expanded position and in engagement with the bushing, preparatory to removal thereof.

I have used the numeral, 10, to indicate generally a steering knuckle having the hollow cylindrical shell or boxing, 11, and the upper and lower bushings, 12 and 13, respectively. The bushings are driven into place under pressure, and frictionally engage the inner surface of the shell, 11. When the bushings become worn, considerable pressure is necessary to remove them, and this has been applied in various ways, among them being the use of a punch inserted through one bushing and engaging one side of the end of the other bushing. One disadvantage of this method lies in the fact that the pressure is not distributed around the edge of the bushing so as to be centered thereover, but tends to cause the bushing to bind more than ever. The other disadvantage is that the interior of the shell, 11, is likely to be damaged so as to hinder the insertion of new bushings. In addition, the process takes much time and effort.

Another method utilizes a tool which is screwed into the end of a bushing and then pulled. Obviously, the pressure thus obtained is not nearly as great as can be obtained by a sharp blow from a hammer. The time involved in screwing and unscrewing the tool is considerable.

The engaging tool, A, is designed to engage the inner end of a bushing so as to transmit pressure around its entire circumference, and the tool, B, is insertable from above through the other bushing so as to transmit the blow of a hammer to the engaging tool, A.

The tool, A, is made of tool steel, turned down at 14 to form a reduced neck, the head, 15, being left at the end, and the shoulder, 16, thus being formed between the head and neck. The head and neck portion of the tool is hollowed by the central bore, 17, and split by the intersecting saw kerfs, 18, so as to form a plurality of resilient fingers having at their ends outwardly extending jaws for engaging the end of the bushing.

The expanding tool is a shaft of cold rolled steel, having its end turned down to form the conical beak, 19, the base of which is of less diameter than the shaft, so as to form the shoulder, 20.

The neck, 14, is of such diameter that when expanded within a bushing to the point where the shoulder, 20, contacts with the head, 15, it will not bind within the bushing, but will fit loosely enough so that the bushing will drop readily from the tool when it has been removed from the shell, 11. The shank of the tool, A, is of such diameter as to readily permit the bushing to pass downwardly thereover.

The conical beak, 19, is of such length and taper as to extend substantially to the bottom of the kerfs, 18, when the shoulder, 20, is engaged against the head, 15, and to be grasped over its entire length by the split portions of the tool, A, with such tenacity that the tool, A, will remain clinging to the tool, B, after the bushing has been removed.

The diameter of the shaft, B, is such as to allow it to pass readily through the upper bushing.

It will thus be seen that after inserting the tools into engagement with the bushing it is only necessary to dislodge the bushing by striking blows against the end of the tool, B, and the bushing will drop away from engagement with the tool as soon as it has been removed from the spindle housing, 11, leaving the tool in the hands of the operator so that he can quickly adjust it to position engaging the next bushing.

It will be seen that after the bushing, 13, has been removed the shell, 11, may be simply inverted and the tools inserted for removing the other bushing without separating the tools.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. In a device of the class described to be used in removing bushings from the ends of an integral journal boxing in which the inner ends of the bushing are spaced from each other, an engaging tool having a head of normal diameter slightly less than the interior diameter of the bushing, and having a reduced neck forming, together with said head, a shoulder, the head and neck being furcated, the engaging tool being insertable through a bushing to a point where the head clears the inner end of the bushing, an expanding tool insertible through the other bushing and having a shank of uniform diameter slightly less than the diameter of said bushing, whereby it may be passed entirely through said other bushing, said expanding tool having a beak receivable within the furcated portion of the engaging tool for expanding the head of the engaging tool, said beak being of such length and diameter relative to the space between the furcations of the engaging tool as to penetrate substantially to the bottom of said space and to be grasped by said furcations during substantially its entire length, whereby said engaging tool will cling to said expanding tool.

2. In a device of the class described to be used with an integral journal boxing having a removable bushing in either end, spaced from each other, an engaging tool having a normal maximum diameter slightly less than the interior diameter of one of said bushings, having a reduced neck forming at one end of said tool a head, said head and neck being furcated, an expanding tool having a conical beak of greater maximum diameter than the diameter of the space between said furcations at the extremity of the head, whereby said beak, when inserted between said furcations, will expand the head to an outside diameter greater than the inside diameter of said bushing.

Signed at Rock Valley, in the county of Sioux and State of Iowa, this 3rd day of June, 1924.

ALFRED W. RICHTER.